US011487695B1

(12) United States Patent
Radhakrishnan et al.

(10) Patent No.: US 11,487,695 B1
(45) Date of Patent: Nov. 1, 2022

(54) SCALABLE PEER TO PEER DATA ROUTING FOR SERVERS

(71) Applicant: Marvell Asia Pte Ltd, Singapore (SG)

(72) Inventors: Sivakumar Radhakrishnan, Portland, OR (US); Rabin Sugumar, Sunnyvale, CA (US); Ham U Prince, San Jose, CA (US)

(73) Assignee: MARVELL ASIA PTE LTD, Singapore (SG)

( * ) Notice: Subject to any disclaimer, the term of this patent is extended or adjusted under 35 U.S.C. 154(b) by 48 days.

(21) Appl. No.: 17/302,111

(22) Filed: Apr. 23, 2021

Related U.S. Application Data

(60) Provisional application No. 63/014,615, filed on Apr. 23, 2020.

(51) Int. Cl.
| | |
|---|---|
| *G06F 12/0875* | (2016.01) |
| *G06F 13/14* | (2006.01) |
| *G06F 13/42* | (2006.01) |
| *G06F 13/28* | (2006.01) |
| *G06F 13/40* | (2006.01) |
| *G06F 12/1009* | (2016.01) |
| *G06F 13/16* | (2006.01) |

(52) U.S. Cl.
CPC ...... *G06F 13/4221* (2013.01); *G06F 12/1009* (2013.01); *G06F 13/1626* (2013.01); *G06F 13/28* (2013.01); *G06F 13/4027* (2013.01); *G06F 2213/0026* (2013.01)

(58) Field of Classification Search
None
See application file for complete search history.

(56) References Cited

U.S. PATENT DOCUMENTS

| | | | | |
|---|---|---|---|---|
| 6,182,178 B1* | 1/2001 | Kelley | ............... | G06F 13/4045 710/107 |
| 9,027,046 B2* | 5/2015 | Guo | ................... | H04N 21/4788 709/227 |
| 2009/0089477 A1* | 4/2009 | Reed | .................. | G06F 13/1642 710/310 |
| 2010/0110083 A1* | 5/2010 | Paltashev | ............ | G06F 15/7867 345/506 |
| 2016/0154756 A1* | 6/2016 | Dodson | ............... | G06F 13/4022 710/316 |
| 2017/0169858 A1* | 6/2017 | Lee | .................. | H04N 21/41407 |

* cited by examiner

*Primary Examiner* — Hyun Nam
(74) *Attorney, Agent, or Firm* — Hamilton, Brook, Smith & Reynolds, P.C.

(57) ABSTRACT

A circuit provides for processing and routing peer-to-peer (P2P) traffic. A bus request queue store a data request received from a first peer device. A decoder compares an address portion of the data request against an address map to determine whether the data request is directed to either a second peer device or a local memory. A bus interface unit, in response to the data request being directed to the second peer device, 1) generates a memory access request from the bus request and 2) transmits the memory access request toward the second peer device via a bus. A memory controller, in response to the data request being directed to a local memory, accesses the local memory to perform a memory access operation based on the data request.

21 Claims, 6 Drawing Sheets

SCALABLE PEER TO PEER DATA ROUTING FOR SERVERS

RELATED APPLICATION

This application claims the benefit of U.S. Provisional Application No. 63/014,615, filed on Apr. 23, 2020. The entire teachings of the above application are incorporated herein by reference.

BACKGROUND

Data server systems, such as ARM-based system-on-chip (SOC) server systems, typically implement software-based solutions for routing peer-to-peer (P2P) traffic between components connected to the server. Such solutions generally do not offer high performance in terms of latency and throughput. One way to overcome P2P limitations is by providing a PCIe switch (e.g., PLX) as a platform for interconnecting components such as graphics processing unit (GPUs), network interface circuits (NICs) and storage devices (e.g., NVMe drives). Using a PCIe switch, P2P traffic is managed at the switch rather than being processed by the host processor (e.g. SOC) at the server. However, this PCIe switch adds significant cost/real estate/power to the motherboard through riser or mezzanine cards, rendering it infeasible for some applications. Thus, having a host-based SOC solution is often preferred due to its lower cost.

For edge servers, adding a PCIe switch is typically an expensive outlay. For example, 5G wireless systems, which are edge-based, require small form factors, and must be power-optimized but high performance to deliver the computational requirements of the wireless standards.

SUMMARY

Example embodiments include a circuit for processing and routing peer-to-peer (P2P) traffic. A bus request queue may be configured to store a data request received from a first peer device via a P2P controller. A decoder may be configured to compare an address portion of the data request against an address map to determine whether the data request is directed to either a second peer device or a local memory. A bus interface unit may be configured to, in response to the data request being directed to the second peer device, 1) generate a memory access request from the bus request and 2) transmit the memory access request toward the second peer device via a bus. A memory controller may be configured to, in response to the data request being directed to a local memory, access the local memory to perform a memory access operation based on the data request.

The memory access request may be a direct memory access (DMA) request. The memory access request may be a write request or a read request, and a reorder queue may be configured to maintain an ordered list of write requests including the write request. A write data buffer may be configured to store data associated with the write request. The bus interface unit may be further configured to transmit the data associated with the write request in a relative order as a function of the ordered list maintained by the reorder queue.

A translation unit may be configured to modify the memory access request, based on an address lookup table, to identify a target address at the second peer device and to handle data completions and responses received from the second peer device. Mesh routing circuitry may be configured to enable peer to peer traffic flow between the first and second peer devices via the bus interface unit. The mesh routing circuitry may include a plurality of ingress ports and egress ports and a lookup table, and the mesh routing circuitry may be configured to determine a path between the first and second peer devices based on the lookup table. A merge unit configured to merge a plurality of partial cache lines into a single data packet, the partial cache lines being a target of the memory access request. Request validation circuitry may be configured to determine whether the data request is compliant with a PCIe Access Control Capabilities (ACS) structure. The P2P controller may be a peripheral component interconnect express (PCIe) controller. The first and second peer devices may be one or more of a graphics processing unit (GPU), solid state drive (SSD), and a network interface controller (NIC). An interconnect structure, such as a mesh circuit, may provide interconnection between processor cores, an I/O subsystem and/or peer devices to enable those components to communicate with one another.

Further embodiments include a method of processing peer-to-peer data traffic. A data request may be stored to a bus request queue, the data request being received from a first peer device via a peer-to-peer (P2P) controller. An address portion of the data request may be compared, via a decoder, against an address map to determine whether the data request is directed to either a second peer device or a local memory. In response to the data request being directed to the second peer device, 1) a memory access request may be generated, via a bus interface unit, from the bus request, and 2) the memory access request may be transmitted via the bus interface unit, toward the second peer device via a bus. In response to the data request being directed to a local memory, the local memory may be accessed, via a memory controller, to perform a memory access operation based on the data request.

The memory access request may be a direct memory access (DMA) request. The memory access request may be a read request or a write request, and an ordered list of write requests may be maintained, via a reorder queue, including the write request. Data associated with the write request may be stored to a write data buffer. The data associated with the write request may be transmitted, via the bus interface unit, in a relative order as a function of the ordered list maintained by the reorder queue. The memory access request may be modified, via a translation unit and based on an address lookup table, to identify a target address at the second peer device and to handle data completions and responses received from the second peer device.

Peer to peer traffic flow between the first and second peer devices via the bus interface unit may be enabled by mesh routing circuitry. A path between the first and second peer devices may be determined based on a lookup table. A plurality of partial cache lines may be merged into a single data packet, the partial cache lines being a target of the memory access request. Whether the data request is compliant with a PCIe Access Control Capabilities (ACS) structure may be determined by request validation circuitry.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

A description of example embodiments follows.

Example embodiments, described herein, address the functional and performance problems inherent in handling peer-to-peer (P2P) I/O traffic flow in server systems such as an ARM-based system-on-chip (SOC) server systems. In particular, a scalable, micro-architecture in an I/O subsystem optimizes P2P communication through several features. For example, an I/O subsystem in example embodiments may handle PCIe ordering issues caused by distributed address decode in a host subsystem in prior-art systems through reordering logic as described below. The I/O subsystem may also reduce power consumption by minimizing snoop look ups and retries at the host by eliminating unnecessary transactions in memory-mapped I/O (MMIO) space reaching the Core/Lx Cache at the host.

The I/O subsystem may also provide dynamic address detection capability, in contrast to static configurations in existing systems. Transactions may be sent from any source to any destination, peer-to-peer, without loss of generality. In doing so, access control capabilities (ACS) (e.g., PCIe SIG) standard and associated egress control (authentication) for security and virtualization services may be integrated seamlessly. Further, example embodiments may deliver high-performance transfers substantial improvement in P2P read and write bandwidths compared to previous approaches. In particular, small packet performance (e.g., 64-Bits) may be improved via an outbound merge logic in a PCIe Cluster in the I/O subsystem.

P2P support has many potential use case models, and many users depend on SOC features that require cross-PCIe traffic for applications, such as GPU-Direct, NIC-Direct, and Storage-Direct configurations.

Figure 1:
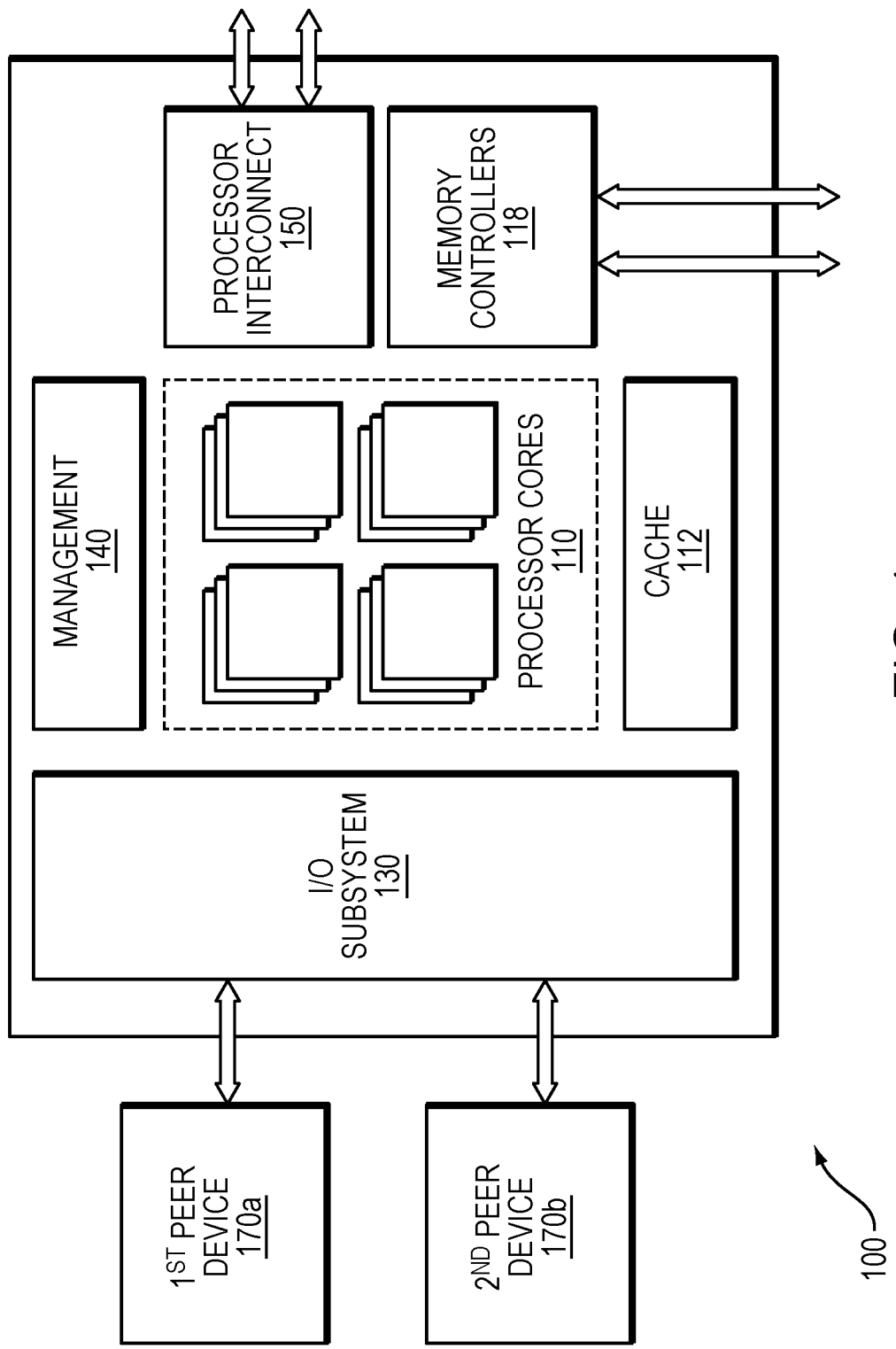
FIG. 1 is a block diagram of a server in which example embodiments may be implemented.

FIG. 1 is a block diagram of a server 100 in which example embodiments may be implemented. The server 100 may be an advanced RISC machine (ARM) server having several processor cores 110 (e.g., 60 CPU cores), and may be implemented as a system-on-chip (SOC). The server 100 may be scalable to multiple nodes with a cache coherency protocol via an inter-processor interconnect 150. Each of the processor cores 110 may be superscalar, out-of-order, quad-issue execute engine, and may be 4-way multithreaded for applications that are sensitive to memory and I/O latency such as the web servers, cloud/virtualization tools and gaming systems. The processor cores 110 may access a common cache 112 (e.g., an L3 cache), and may access one or more external memory devices (e.g., DDR4 memory) via memory controllers 118. A management unit 140 may be configured to perform a range of management operations, such as security and power management.

An I/O subsystem 130 may be configured to interface with a number of external devices, such as a first peer device 170a and a second peer device 170b. The peer devices 170a-b, as well as other devices connected to the I/O subsystem 130, may include one or more graphics processing units (GPUs), solid state drives (SSDs), and network interface controllers (NICs), depending on a desired application. The I/O subsystem 130 may route communications between the external devices, the processor cores 110, external memory (via the memory controllers 118), and/or external processing nodes (via the processor interconnect 150). In one embodiment, the I/O subsystem 130 may provide such I/O expansion capability through one or more PCIe IP (Gen4) controllers that connect through the physical/SerDes interface to the external end point (e.g., peer devices 170a-b). The I/O subsystem 130 may comprise multiple modules, and in one embodiment, each of four modules may have a PCIe x16 interface, for a maximum of 64 PCIe G4 lanes. Optionally, those modules may also have other interface controllers, such as a serial ATA (SATA) controllers.

The I/O subsystem 130 may be configured to handle all of the data flows for various applications stemming from networking, storage and web/virtualization needs. In particular, the I/O subsystem 130 may provide high performance (line rate) PCIe peer-to-peer communication (P2P). This feature enables two PCIe devices, such as the peer devices 170a-b, to directly transfer data to each other without using host memory, and which does not require the processor cores 110 for the data transfer.

Figure 2:
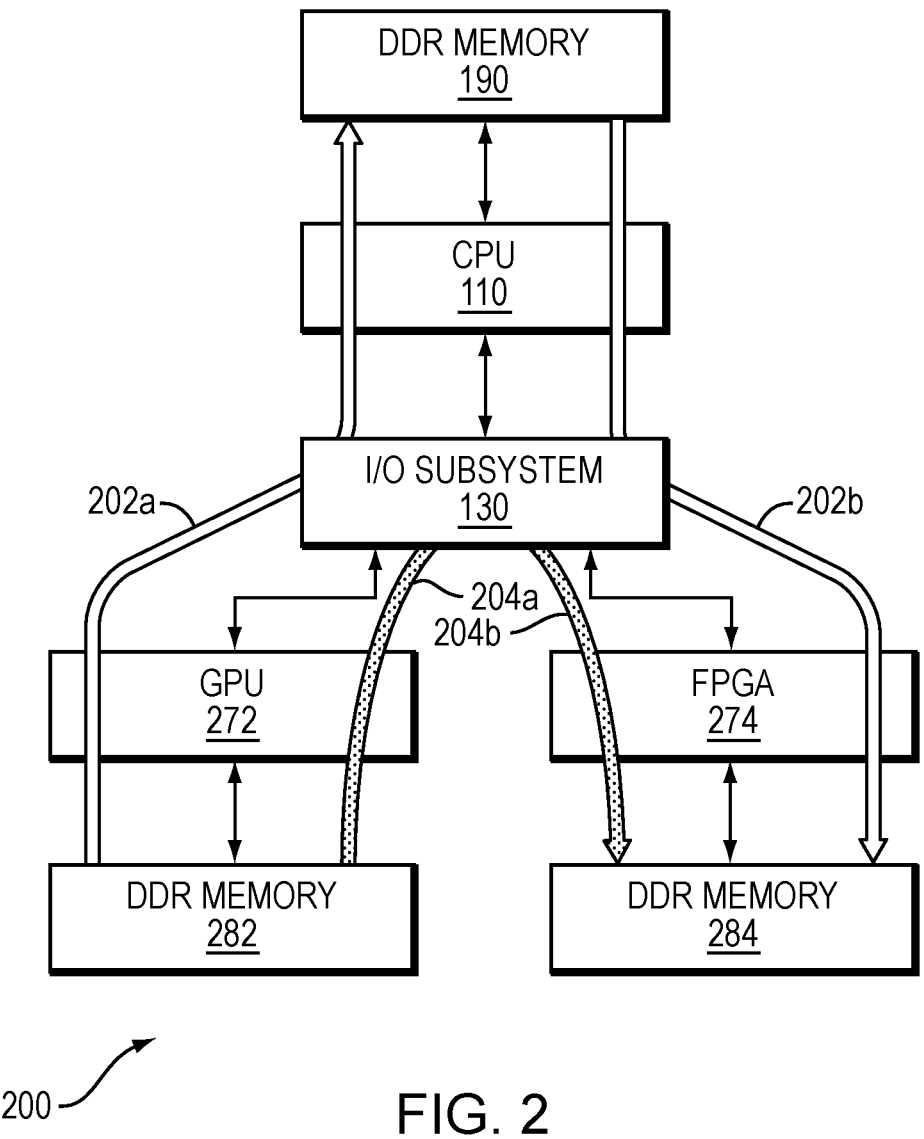
FIG. 2 is a block diagram of a peer-to-peer (P2P) network in which example embodiments may be implemented.

FIG. 2 is a block diagram of a P2P network 200, and illustrates a transaction flow for P2P transactions through the I/O subsystem 130. The network 200 includes components of the server 100 described above, including the processor cores 110 and the I/O subsystem 130. The I/O subsystem 130, in turn, is communicatively coupled (e.g., via a PCIe bus) to a GPU 272 and a field-programmable gate array (FPGA) device 274, which may be examples of the peer devices 170a-b described above. Each of these devices may include or connect to respective memory 282, 284 (e.g., a DDR memory device), and the processor cores 110 may connect to a memory 190 via the memory controllers 118 as shown in FIG. 1.

The network 200 facilitates P2P communications between the peer devices, the GPU 272 and the FPGA 274. In previous approaches, communications between the devices 272, 274 have followed a path 202a-b that first extends from the GPU 272 to the processor cores 110, which process the communication (e.g., a data read or write request) to determine the destination of the communication, access the server memory 190 if required, and then route the communication back through the I/O subsystem 130 to the FPGA 274. This path 202a-b is typically implemented by software-based solutions for routing P2P traffic between components connected to the server 100. Such solutions often exhibit low performance in terms of latency and throughput, and require use of the processor cores 110 to identify the destination of P2P communications and route those communications accordingly.

In contrast, in example embodiments, the I/O subsystem 130 may be configured to process and route P2P traffic between peer devices without involvement of the processor cores 110. In such an embodiment, communications between the devices 272, 274 may follow a path 204a-b that first extends from the GPU 272 to the I/O subsystem 130, and then to the FPGA 274. As a result, the GPU 272 can directly read/write data from/to the FPGA device 274 via the server 100 without involving the processor cores 110 or host memory 190 through the PCIe ports of the server 100.

Figure 3:
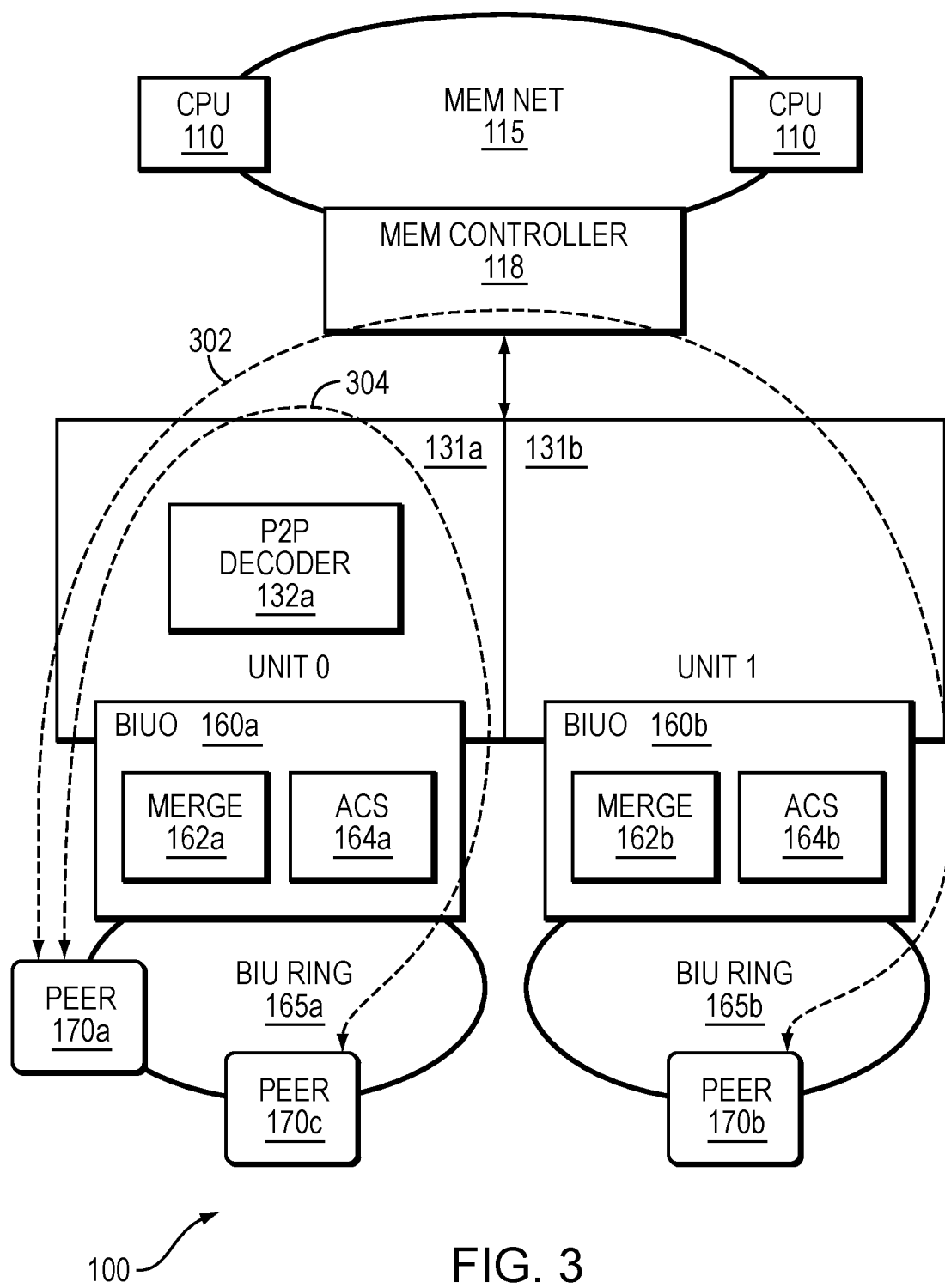
FIG. 3 is a diagram of an input/output (I/O) subsystem in one embodiment.

FIG. 3 is a diagram of a portion of the server 100 in further detail, with focus on the I/O subsystem 130. Here, the I/O subsystem 130 is shown as two I/O units 131*a-b*, each of which may serve as a conduit to transfer data to and from 1) the memory network 115, which links the processor cores 110 and external memory (via the memory controller 118), and 2) bus interface unit (BIU) rings 165*a-b* via BIUs 160*a-b*, which connect to peer devices 170*a-c*. Each BIU 160*a-b* may operate as an interface between the I/O units 131*a-b* and the BIU rings 165*a-b* connecting to the peer devices 170*a-c*. Each BIU 160*a-b* may include a merge module 162*a-b*, which may be configured to merge a plurality of partial cache lines into a single data packet, the partial cache lines being a target of a memory access request. The BIU 160*a* is described further below with reference to FIGS. 4 and 5. The BIUs 160*a-b* may also include PCIe Access Control Capabilities (ACS) request validation circuits 164*a-b*, which is configured to determine whether the data request is compliant with a PCIe Access Control Capabilities (ACS) structure. The block request validation circuits 164*a-b* may operate in conjunction with an address decoder (e.g., P2P decoder unit 132*a*) and egress control for handling ACS pass-through or flagging a violation for ACS P2P request redirect and completion redirect requirements.

Each I/O unit 131*a-b* may have multiple (e.g., 8) BIUs connected to it. Requests associated with the I/O units 131*a-b* can be categorized as follows: a) a peer device request is sent into an I/O unit 131*a* with a physical memory address from a peer device, and b) a processor request is sent by a processor core 110 through the memory network 115 to the I/O unit 131*a* en-route to a peer device 170*a*.

To facilitate P2P communications between peer devices 170*a-c*, the I/O units 131*a-b* and BIUs 160*a-b* may include several features to process and route the communications between the peer devices 170*a-c* without involvement of the processor cores 110, as illustrated by a communications path 304. The I/O units 131*a-b* and BIUs 160*a-b* may also facilitate communications between the peer devices 170*a-c* and the memory network 115, as illustrated by the communications path 302. A P2P decoder unit 132*a* may compare an address portion of the data request against an address map to determine whether the data request is directed to either a peer device or a memory connected to the memory network 115. Features and operation of the I/O units 131*a-b* and BIUs 160*a-b* are described in further detail below with reference to FIGS. 4-6.

Figure 4:
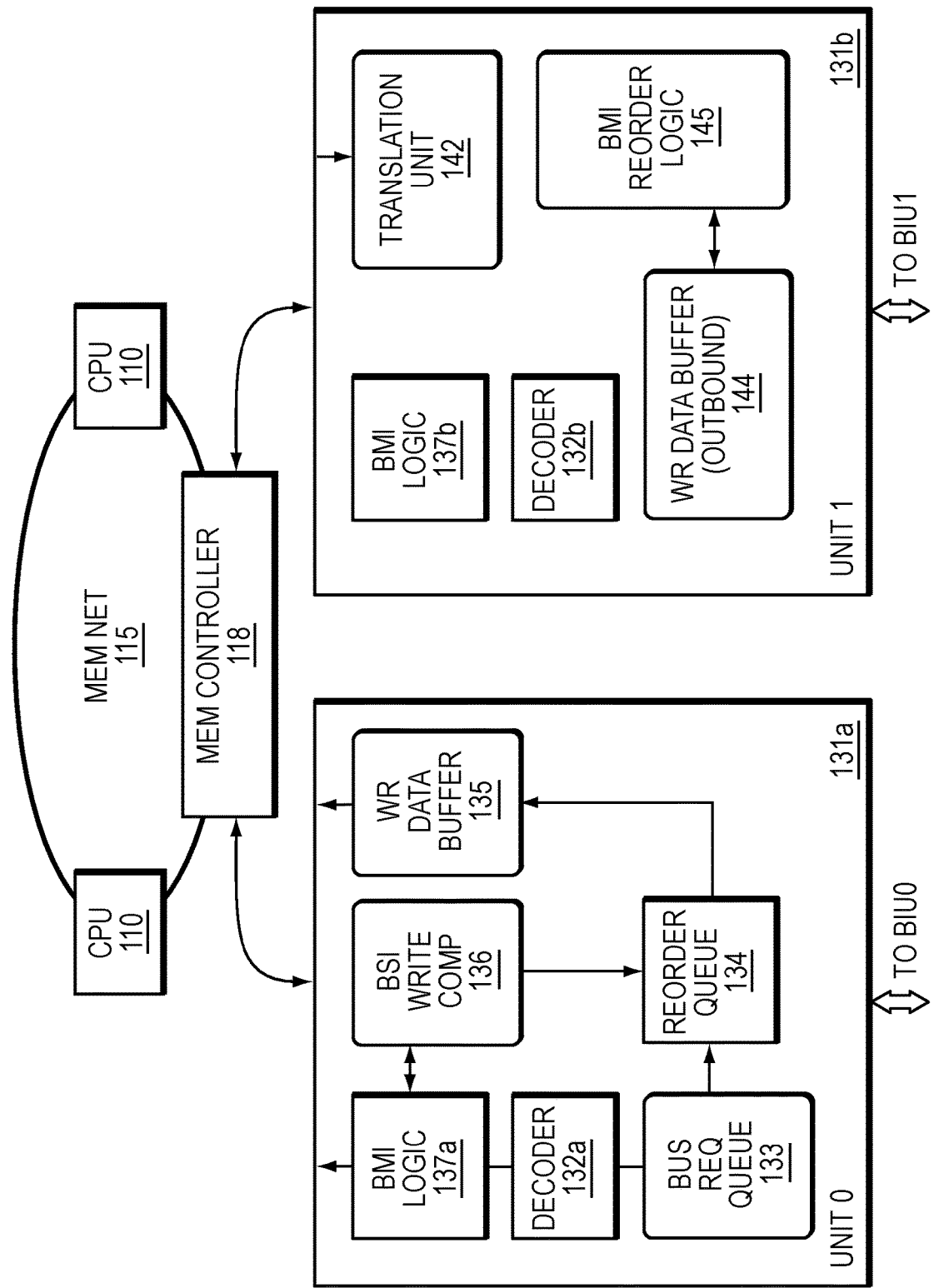
FIG. 4 is a diagram of an I/O subsystem in further detail.

FIG. 4 illustrates the I/O units 131*a-b* of the I/O subsystem 130 in further detail. In an example operation described below, the I/O unit 131*a* operates as a source unit providing a request from a first peer device 170*a* via BIU0 160*a*, and the I/O unit 13 lb operates as a destination unit transferring the request to a second peer device 170*b* via BIU1 160*b*. For clarity, only a subset of the components of each I/O unit 131*a-b* is shown; the I/O units 131*a-b* may each include all of the components described below.

At the source I/O unit 131*a*, a bus request queue 133 receives and stores a data request from the first peer device 170*a* via the BIU0 160*a*, a P2P PCIe controller. If the request is a write request that requires completion in a given order, then the request or a representation thereof may be stored at a reorder queue 134 to maintain an order of relevant write operations. the P2P address decoder unit 132*a* may compare an address portion of the data request against an address map to determine whether the data request is directed to either a peer device or a memory connected to the memory network 115. To do so, the decoder unit 132*a* may perform a lookup of the destination address of the request against an address map that cross-references addresses and destination locations including the local memory of the server 100 and P2P devices 170*a-c*. The address map may indicate a plurality of address ranges, each address range being associated with a respective destination.

A bus master interface (BMI) circuit 137*a* receives the determination from the decoder 132*a* and routes the data request toward the identified destination. To do so, the BMI circuit 137*a* may include mesh mapping/routing logic to facilitate traffic between the I/O units 131*a-b*. The mesh circuitry may comprise an ingress and egress port for each connection point, as well as a lookup table that determines the path to the destination. Based on this table, the BMI circuit 137*a* may configure an internal switch to forward the messages toward the destination via the memory network 115.

For write requests, a write data buffer 135 may store the data to be written in an order in accordance with the reorder queue 134. The write data buffer 135 may take in potentially out-of-order write completions and align the write data in the original request order before dispatching it towards the destination I/O unit 13 lb. Upon a successful write at the destination, a confirmation may be returned to the BMI circuit 137*a*, which forwards it to a write completion unit 136. The write completion unit 134, in turn, may update the reorder queue 134 to remove the indication of the respective write request.

The memory controller 118 may receive the data request, along with the indication of the destination provided by the decoder 132*a*. If the data request is directed to a local memory of the server 100, then the memory controller 118 may access the local memory to perform a memory access operation (e.g. a read or write operation) in accordance with the data request. The data request may be a direct memory access (DMA) request. On the other hand, if the data request is directed to the peer device 171*b*, then the memory controller 118 enables the data request to be transferred to the destination I/O unit 13 lb. In further embodiments, the I/O units 131*a-b* may be communicatively coupled in other configurations, such as by a direct connection that is not intersected by the memory controller. In such a configuration, the memory controller or other interface unit connecting to a memory device may receive a copy of the data request independent of its transmission to one or more I/O units 131*a-b*. The data request may also be broadcast to all potential destinations including the I/O units 131*a-b* and the memory controller 118.

At the destination unit 131*b*, a translation unit 142 may modify the data request, based on an address lookup table mapping destination addresses, to identify a target address at the second peer device 170*b* and to handle data completions and responses received from the second peer device 170*b*. For write requests, a reorder circuit 145 may manage out-of-order arrival of write requests by mapping the write data arriving from the source I/O unit 131*a* in the correct sequence based on an indication from the source I/O unit 131*a*. Once the correct sequence is determined, the reorder circuit 145 may populate a write data buffer 144 with the ordered write data. The I/O unit 13 lb may then forward the write data from the buffer 144 to the BIU1 160*b*, which, in turn, forwards the write data to the destination peer device 170*b* for writing to its local memory. If the data request is a read request, the reorder circuit 145 and write data buffer 144 may be bypassed. The BMI circuit 137*b* and address decoder unit 132*b* may operate as their counterparts at the I/O unit 131*a* when the I/O unit 13 lb operates as a source of a data request.

Figure 5:
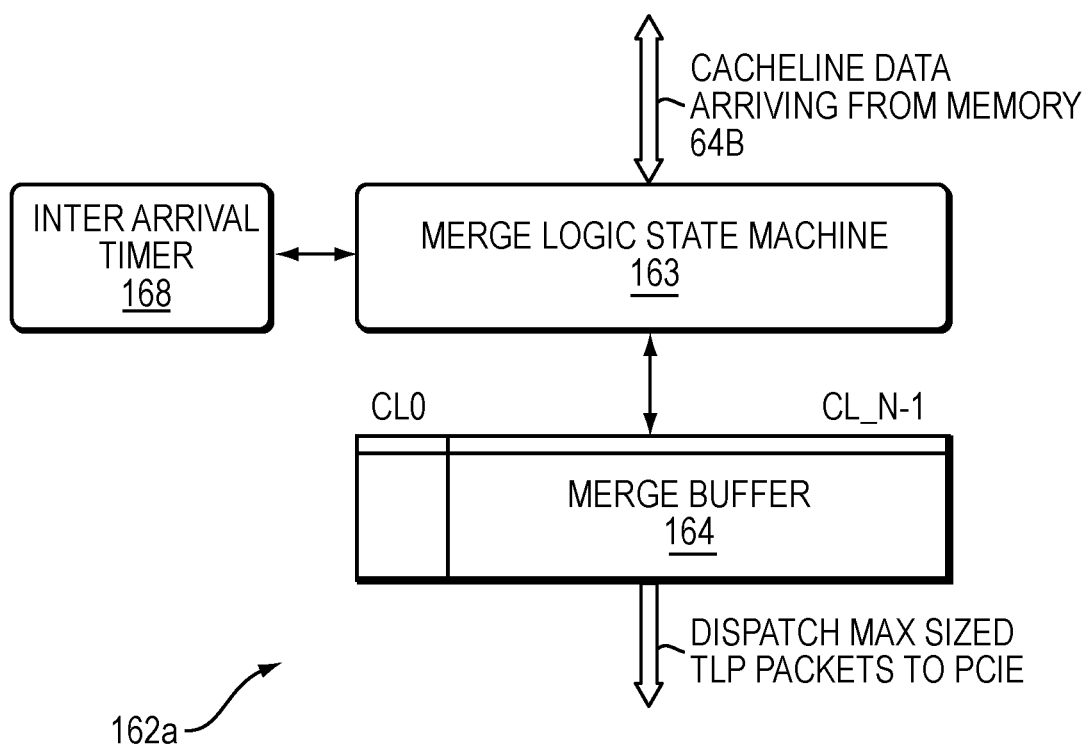
FIG. 5 is a diagram of a merge state machine in one embodiment.

FIG. 5 is a diagram of the merge module 162*a* in further detail. The merge module 162*a* may operate to merge a plurality of partial cache lines into a single data packet, the partial cache lines being a target of the memory access request. The merge module may include a merge state machine 163, an arrival timer 168 to indicate an arrival time of a cache line to the merge state machine 163, and a merge buffer 164 that buffers outgoing data packets to a destination peer device. In example embodiments, the PCIe cluster provides an optimization wherein successive partial cache line whose addresses are contiguous can be coalesced into a larger packet, provided that these cache lines arrive within a certain defined interval. This solution increases transfer efficiency by amortizing the TLP overheads with a larger payload. For example, if the BIU receives 8 back-to-back 64B writes in linear order, the merge state machine 163 can first determine whether the writes have arrived within a threshold time period as indicated by the arrival timer. If so, then the merge state machine 163 may merge the writes into a single packet (e.g., a 512B packet) and then loads the packet to the merge buffer 164 before transferring the packet toward the destination peer device. In further embodiments, the merge buffer may have a larger maximum packet size, such as 1025B.

Figure 6:
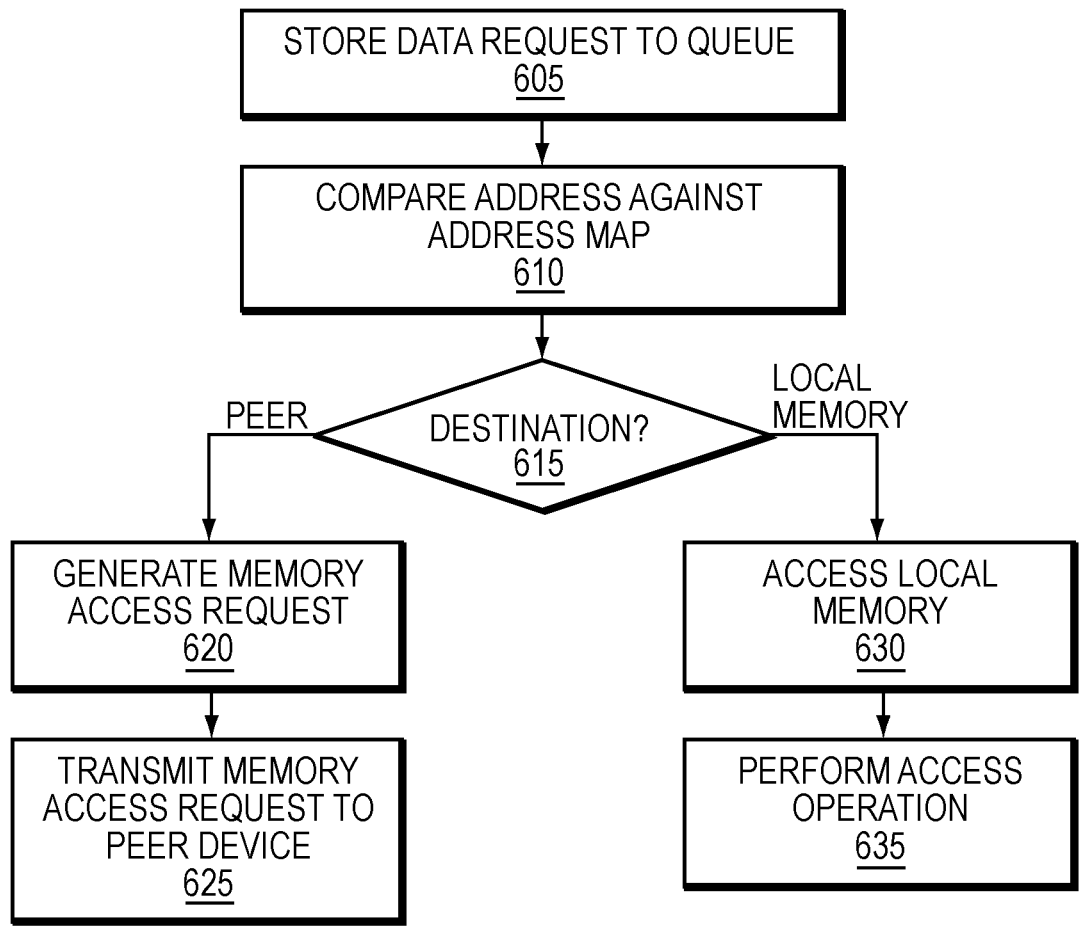
FIG. 6 is a flow diagram of a process of routing P2P traffic in one embodiment.

FIG. 6 is a flow diagram of a process 600 of routing P2P traffic in one embodiment. With reference to FIGS. 3 and 4 as an illustrative example, a source I/O unit 131a may receive a data request from a first peer device 170a via the BIU0 160a and store the data request to the bus request queue 133 (605). The decoder 132a may then compare an address portion of the data request against an address map to determine whether the data request is directed to either a second peer 170b device or a local memory (610, 615). In response to the data request being directed to the second peer device 170b, the data request may be forwarded to the BIU1 160b, which generates a memory access request from the bus request (620), and then transmits the memory access request toward the second peer device via a bus (e.g. PCIe bus) (625). In response to the data request being directed to a local memory, the memory controller 118 may access the local memory to perform a memory access operation based on the data request.

Thus, example embodiments provide a solution to the bandwidth problems that manifests in P2P traffic flows within a server, and provide a u-architectural implementation that is scalable and flexible while meeting the performance and functionality demanded in many server-based applications. Embodiments may improve throughput for various applications relying on P2P traffic flow, such as CUDA; increase overall system utilization by providing extra snoop cycles to the processor cores; lower dynamic power consumption due to optimized transaction flow; conform to PCIe SIG ACS standards; and reduce the memory foot print.

While example embodiments have been particularly shown and described, it will be understood by those skilled in the art that various changes in form and details may be made therein without departing from the scope of the embodiments encompassed by the appended claims.

What is claimed is:

1. A circuit comprising:
   a bus request queue configured to store a data request received from a first peer device via a peer-to-peer (P2P) controller;
   a decoder configured to compare an address portion of the data request against an address map to determine whether the data request is directed to either a second peer device or a local memory;
   a bus interface unit configured to, in response to the data request being directed to the second peer device, 1) generate a memory access request from the bus request and 2) transmit the memory access request toward the second peer device via a bus; and
   a memory controller configured to, in response to the data request being directed to a local memory, access the local memory to perform a memory access operation based on the data request.

2. The circuit of claim 1, wherein the memory access request is a direct memory access (DMA) request.

3. The circuit of claim 1, wherein the memory access request is a write request, and further comprising a reorder queue configured to maintain an ordered list of write requests including the write request.

4. The circuit of claim 3, further comprising a write data buffer configured to store data associated with the write request.

5. The circuit of claim 4, wherein the bus interface unit is further configured to transmit the data associated with the write request in a relative order as a function of the ordered list maintained by the reorder queue.

6. The circuit of claim 1, wherein the memory access request is a read request.

7. The circuit of claim 1, further comprising a translation unit configured to modify the memory access request, based on an address lookup table, to identify a target address at the second peer device and to handle data completions and responses received from the second peer device.

8. The circuit of claim 1, further comprising mesh routing circuitry configured to enable peer-to-peer traffic flow between the first and second peer devices via the bus interface unit.

9. The circuit of claim 8, wherein the mesh routing circuitry includes a plurality of ingress ports and egress ports and a lookup table, the mesh routing circuity configured to determine a path between the first and second peer devices based on the lookup table.

10. The circuit of claim 1, further comprising a merge unit configured to merge a plurality of partial cache lines into a single data packet, the partial cache lines being a target of the memory access request.

11. The circuit of claim 1, further comprising request validation circuitry configured to determine whether the data request is compliant with a PCIe Access Control Capabilities (ACS) structure.

12. The circuit of claim 1, wherein the P2P controller is a peripheral component interconnect express (PCIe) controller.

13. The circuit of claim 1, wherein the first and second peer devices are one or more of a graphics processing unit (GPU), solid state drive (SSD), and a network interface controller (NIC).

14. A method of processing peer-to-peer data traffic comprising:
   storing a data request to a bus request queue, the data request being received from a first peer device via a peer-to-peer (P2P) controller;
   comparing, via a decoder, an address portion of the data request against an address map to determine whether the data request is directed to either a second peer device or a local memory;
   in response to the data request being directed to the second peer device, 1) generating, via a bus interface unit, a memory access request from the bus request, and 2) transmitting, via the bus interface unit, the memory access request toward the second peer device via a bus; and in response to the data request being directed to a local memory, accessing, via a memory controller, the local memory to perform a memory access operation based on the data request.

15. The method of claim 14, wherein the memory access request is a direct memory access (DMA) request.

16. The method of claim 14, wherein the memory access request is a write request, and further comprising maintaining, via a reorder queue, an ordered list of write requests including the write request.

17. The method of claim 16, further comprising storing data associated with the write request to a write data buffer.

18. The method of claim 17, further comprising transmitting, via the bus interface unit, the data associated with the write request in a relative order as a function of the ordered list maintained by the reorder queue.

19. The method of claim 14, wherein the memory access request is a read request.

20. The method of claim 14, further comprising modifying, via a translation unit, the memory access request, based on an address lookup table, to identify a target address at the second peer device and to handle data completions and responses received from the second peer device.

21. A system for processing peer-to-peer data traffic comprising:

means for storing a data request, the data request being received from a first peer device via a peer-to-peer (P2P) controller;

means for comparing an address portion of the data request against an address map to determine whether the data request is directed to either a second peer device or a local memory;

means for, in response to the data request being directed to the second peer device, 1) generating a memory access request from the bus request, and 2) transmitting the memory access request toward the second peer device via a bus; and means for, in response to the data request being directed to a local memory, accessing the local memory to perform a memory access operation based on the data request.

* * * * *

UNITED STATES PATENT AND TRADEMARK OFFICE
CERTIFICATE OF CORRECTION

| | |
|---|---|
| PATENT NO. | : 11,487,695 B1 |
| APPLICATION NO. | : 17/302111 |
| DATED | : November 1, 2022 |
| INVENTOR(S) | : Sivakumar Radhakrishnan, Rabin Sugumar and Ham U Prince |

It is certified that error appears in the above-identified patent and that said Letters Patent is hereby corrected as shown below:

In the Drawings

In Fig. 3, Sheet 3 of 6, in Tag "160a", Line 1, delete "BIUO" and insert -- BIU0 --.

In Fig. 3, Sheet 3 of 6, in Tag "160b", Line 1, delete "BIUO" and insert -- BIU0 --.

In the Specification

In Column 2, Line 5, delete "circuity" and insert -- circuitry --.

In Column 4, Line 14, delete "PCie" and insert -- PCIe --.

In Column 5, Line 49, delete "13 lb" and insert -- 131b --.

In Column 6, Line 20, delete "13 lb." and insert -- 131b. --.

In Column 6, Line 36, delete "13 lb." and insert -- 131b. --.

In Column 6, Line 57, delete "13 lb" and insert -- 131b --.

In Column 6, Line 64, delete "13 lb" and insert -- 131b --.

In the Claims

In Column 8, Line 38, in Claim 9, delete "circuity" and insert -- circuitry --.

Signed and Sealed this
Fifteenth Day of August, 2023

Katherine Kelly Vidal
*Director of the United States Patent and Trademark Office*